(12) United States Patent
Alanen et al.

(10) Patent No.: US 8,412,108 B2
(45) Date of Patent: Apr. 2, 2013

(54) APPARATUS, METHODS AND COMPUTER PROGRAMS

(75) Inventors: Kimmo Marko Tapani Alanen, Lempäälä (FI); Jari Tapani Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 803 days.

(21) Appl. No.: 12/082,687

(22) Filed: Apr. 10, 2008

(65) Prior Publication Data

US 2010/0029218 A1 Feb. 4, 2010

(51) Int. Cl.
*H04B 17/00* (2006.01)
(52) U.S. Cl. ............... 455/67.11; 455/436; 455/513; 455/67.13; 455/550.1; 455/552.1; 455/115.1; 455/115.3; 455/135; 455/161.3; 455/226.1; 455/226.3; 455/227
(58) Field of Classification Search .......... 455/436–444, 455/513, 67.11, 67.14, 550.1, 552.1, 553.1, 455/115.1, 115.2, 115.3, 115.4, 134, 135, 455/161.3, 226.1–226.4, 227.2, 67.13, 226.3, 455/227
See application file for complete search history.

(56) References Cited

U.S. PATENT DOCUMENTS

| | | | |
|---|---|---|---|
| 5,678,169 A | 10/1997 | Turney | |
| 5,722,053 A | 2/1998 | Kornfeld et al. | |
| 6,141,762 A | 10/2000 | Nicol et al. | |
| 7,633,915 B1 * | 12/2009 | Lewis | 370/338 |
| 2006/0099923 A1 | 5/2006 | Wildhagen | |

FOREIGN PATENT DOCUMENTS

| | | |
|---|---|---|
| EP | 0 961 512 | 12/1999 |
| EP | 0 978 781 | 2/2000 |
| EP | 1 432 156 | 6/2004 |

OTHER PUBLICATIONS

Notification of Transmittal of the International Search Report and the Written Opinion of the International Searching Authority (1 page), International Search Report (4 pages) and Written Opinion of the International Searching Authority (5 pages), 10 pages total with mailing date of Jun. 10, 2009.

* cited by examiner

*Primary Examiner* — Junpeng Chen
(74) *Attorney, Agent, or Firm* — Locke Lord LLP (57) ABSTRACT

A method including: processing at a first processing frequency, such that each instance of processing is separated by a first processing time period, at least a first signal; increasing the processing frequency to a second processing frequency and switching from processing the first signal to processing a second signal; determining a parameter indicative of the quality of the second signal; and determining, within the first processing time period measured from the last instance of processing the first signal at the first frequency, which one or more signals to process at the next instance of processing by comparing respective parameters of at least the first and second signals.

31 Claims, 7 Drawing Sheets

APPARATUS, METHODS AND COMPUTER PROGRAMS

FIELD OF THE INVENTION

Embodiments of the present invention relate to apparatus, methods and computer programs. In particular, they relate to apparatus, methods and computer programs in a mobile cellular telephone.

BACKGROUND TO THE INVENTION

Apparatus, such as mobile cellular telephones, may comprise a plurality of antenna elements and/or be operable to receive a plurality of signals in different operational frequency bands and different protocols. The reception performance may be different for each of the antenna elements and the quality of signals in different operational frequency bands and protocols may also vary.

For example, where an apparatus includes a plurality of antenna elements, the reception performance of one or more of the antenna elements may be affected by the orientation of the apparatus (and hence the orientation of the antenna elements) relative to the source of the signals. Additionally, the reception performance of an antenna element may be affected by the proximity of objects to the antenna element which electromagnetically couple to the antenna element and cause interference.

An apparatus may be configured to read and process only one received signal at a given time. Consequently, the apparatus may not always be receiving from the antenna element which has the best reception performance or be receiving at the best operational frequency band.

Therefore, it would be desirable to provide an alternative apparatus.

BRIEF DESCRIPTION OF VARIOUS EMBODIMENTS OF THE INVENTION

According to various, but not necessarily all, embodiments of the invention there is provided a method comprising: processing at a first processing frequency, such that each instance of processing is separated by a first processing time period, at least a first signal; increasing the processing frequency to a second processing frequency and switching from processing the first signal to processing a second signal; determining a parameter indicative of the quality of the second signal; and determining, within the first processing time period measured from the last instance of processing the first signal at the first frequency, which one or more signals to process at the next instance of processing by comparing respective parameters of at least the first and second signals.

The method may comprise determining a parameter indicative of the quality of the first signal while processing the first signal at the first processing frequency.

The method may comprise switching from processing the second signal to processing the first signal within the first processing time period measured from the last instance of processing the first signal at the first frequency. The method may comprise determining a parameter indicative of the quality of the first signal.

The method may further comprise selecting one of at least the first and second signals for the next instance of processing at the first processing frequency, using the determination of which signal to process, within the first processing time period.

The method may further comprise controlling a display to display navigational information using the selected signal.

The method may further comprise receiving the first and second signals via a single antenna element. The first signal may be in a first operational frequency band and the second signal may be in a second operational frequency band, different to the first operational frequency band.

The method may further comprise controlling a tuner to adapt the resonant frequency band of the antenna element between the first operational frequency band and the second operational frequency band.

The method may further comprise receiving the first signal from a first antenna element and receiving the second signal from a second antenna element.

The method may further comprise controlling a switch to switch between connecting to the first antenna element and to the second antenna element to receive the first signal or second signal respectively.

The first signal and the second signal may be in the same operational frequency band.

The method may further comprise controlling a first tuner to adapt the resonant frequency band of the first antenna element between a first operational frequency band and a second operational frequency band. The method further comprise controlling a second tuner to adapt the resonant frequency band of the second antenna element between a first operational frequency band and a second operational frequency band.

According to various, but not necessarily all, embodiments of the invention there is provided an apparatus comprising: a controller including: a first controller module configured to process at a first processing frequency, such that each instance of processing is separated by a first processing time period, at least a first signal; a second controller module configured to control the first controller module to increase the processing frequency to a second processing frequency, and configured to control switching from processing the first signal to processing a second signal, and configured to determine a parameter indicative of the quality of the second signal; and configured to determine, within the first processing time period measured from the last instance of processing the first signal at the first frequency, which one or more signals to process at the next instance of processing by comparing respective parameters of at least the first and second signals.

The apparatus may be for communication and may be for wireless communication.

The second controller module may be configured to determine a parameter indicative of the quality of the first signal while the first controller module is processing the first signal at the first processing frequency.

The second controller module may be configured to control switching from processing the second signal to processing the first signal within the first processing time period measured from the last instance of processing the first signal at the first frequency, and is configured to determine a parameter indicative of the quality of the first signal.

The second controller module may be configured to select one of at least the first and second signals for the next instance of processing at the first processing frequency, using the determination of which signal to process, within the first processing time period.

The apparatus may further comprise a display. The controller may be configured to control the display to display navigational information using the selected signal.

The apparatus may further comprise a single antenna element configured to receive the first and second signals. The first signal may be in a first operational frequency band and the second signal may be in a second operational frequency band, different to the first operational frequency band.

The apparatus may further comprise a tuner configured to adapt the resonant frequency band of the antenna element between the first operational frequency band and the second operational frequency band. The second controller module may be configured to control the tuner.

The apparatus may further comprise a first antenna element configured to receive the first signal and a second antenna element configured to receive the second signal.

The apparatus may further comprise a switch configured to switch between connecting to the first antenna element and to the second antenna element to receive the first signal or second signal respectively. The second controller module may be configured to control the switch.

The first signal and the second signal may be in the same operational frequency band.

The apparatus may further comprise a first tuner configured to adapt the resonant frequency band of the first antenna element between a first operational frequency band and a second operational frequency band. The second controller module may be configured to control the first tuner.

The apparatus may further comprise a second tuner configured to adapt the resonant frequency band of the second antenna element between a first operational frequency band and a second operational frequency band. The second controller module may be configured to control the second tuner.

According to various, but not necessarily all, embodiments of the invention there is provided a computer-readable storage medium encoded with instructions that, when executed by a processor, perform: processing at a first processing frequency, such that each instance of processing is separated by a first processing time period, at least a first signal; increasing the processing frequency to a second processing frequency and switching from processing the first signal to processing a second signal; determining a parameter indicative of the quality of the second signal; and determining, within the first processing time period measured from the last instance of processing the first signal at the first frequency, which one or more signals to process at the next instance of processing by comparing respective parameters of at least the first and second signals.

The computer-readable storage medium may be encoded with instructions that, when executed by a processor, perform: selecting one of at least the first and second signals for the next instance of processing at the first processing frequency, using the determination of which signal to process, within the first processing time period.

According to various, but not necessarily all, embodiments of the invention there is provided a computer program that, when run on a computer, performs: processing at a first processing frequency, such that each instance of processing is separated by a first processing time period, at least a first signal; increasing the processing frequency to a second processing frequency and switching from processing the first signal to processing a second signal; determining a parameter indicative of the quality of the second signal; and determining, within the first processing time period measured from the last instance of processing the first signal at the first frequency, which one or more signals to process at the next instance of processing by comparing respective parameters of at least the first and second signals.

The computer program may, when run on a computer, perform: selecting one of at least the first and second signals for the next instance of processing at the first processing frequency, using the determination of which signal to process, within the first processing time period.

According to various, but not necessarily all, embodiments of the invention there is provided a computer program product directly loadable into a memory of a digital computer, comprising the computer program described in the preceding paragraphs.

According to various, but not necessarily all, embodiments of the invention there is provided a module comprising an apparatus as described in any of the preceding paragraphs.

According to various, but not necessarily all, embodiments of the invention there is provided a chipset comprising an apparatus as claimed in any of the preceding paragraphs.

According to various, but not necessarily all, embodiments of the invention there is provided an apparatus comprising: means for processing at a first processing frequency, such that each instance of processing is separated by a first processing time period, at least a first signal; means for increasing the processing frequency to a second processing frequency and switching from processing the first signal to processing a second signal; means for determining a parameter indicative of the quality of the second signal; and means for determining, within the first processing time period measured from the last instance of processing the first signal at the first frequency, which one or more signals to process at the next instance of processing by comparing respective parameters of at least the first and second signals.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 2:
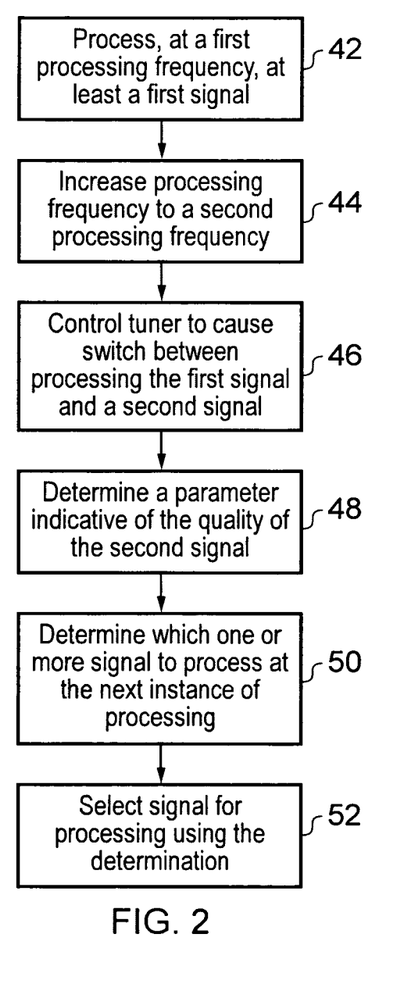
FIG. 2 illustrates a flow chart of a method for the apparatus illustrated in FIG. 1 according to various embodiments of the present invention.
Figure 5:
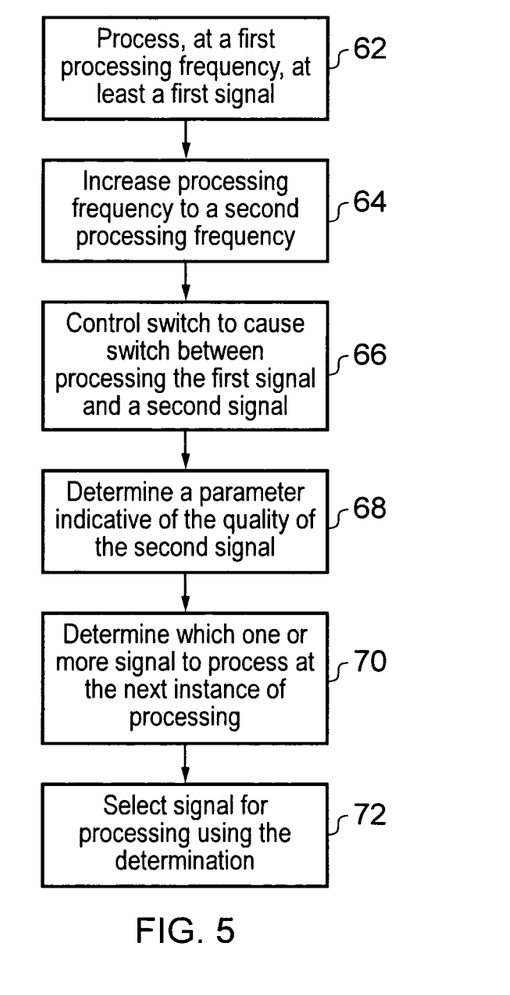
FIG. 5 illustrates a flow chart of a method for the apparatus illustrated in FIG. 4 according to various embodiments of the present invention.
Figure 7:
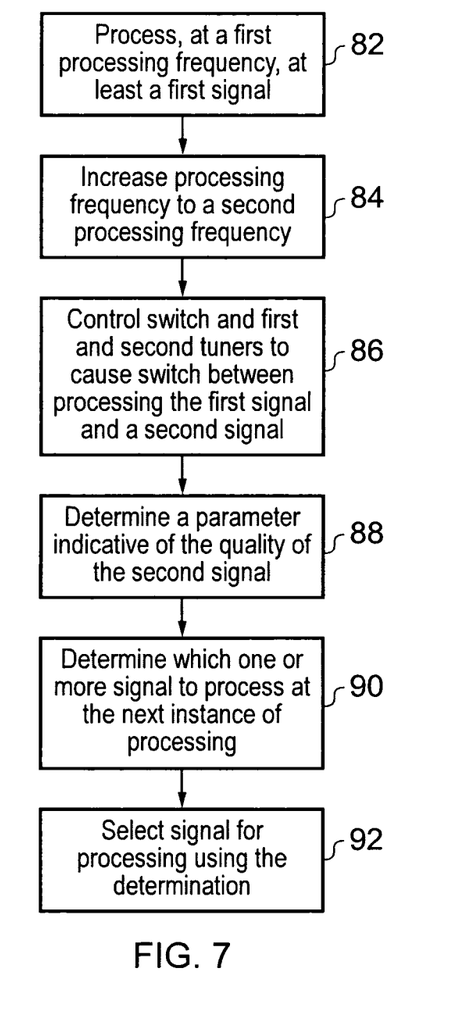
FIG. 7 illustrates a flow chart of a method for the apparatus illustrated in FIG. 6 according to various embodiments of the present invention.

FIGS. 2, 5 and 7 illustrate a method comprising: processing at a first processing frequency, such that each instance of processing is separated by a first processing time period, at least a first signal 38; increasing the processing frequency to a second processing frequency and switching from processing the first signal 38 to processing a second signal 40; determining a parameter indicative of the quality of the second signal; and determining, within the first processing time period measured from the last instance of processing the first signal 38 at the first frequency, which one or more signals 38, 40 to process at the next instance of processing by comparing respective parameters of at least the first and second signals 38, 40.

Figure 1:
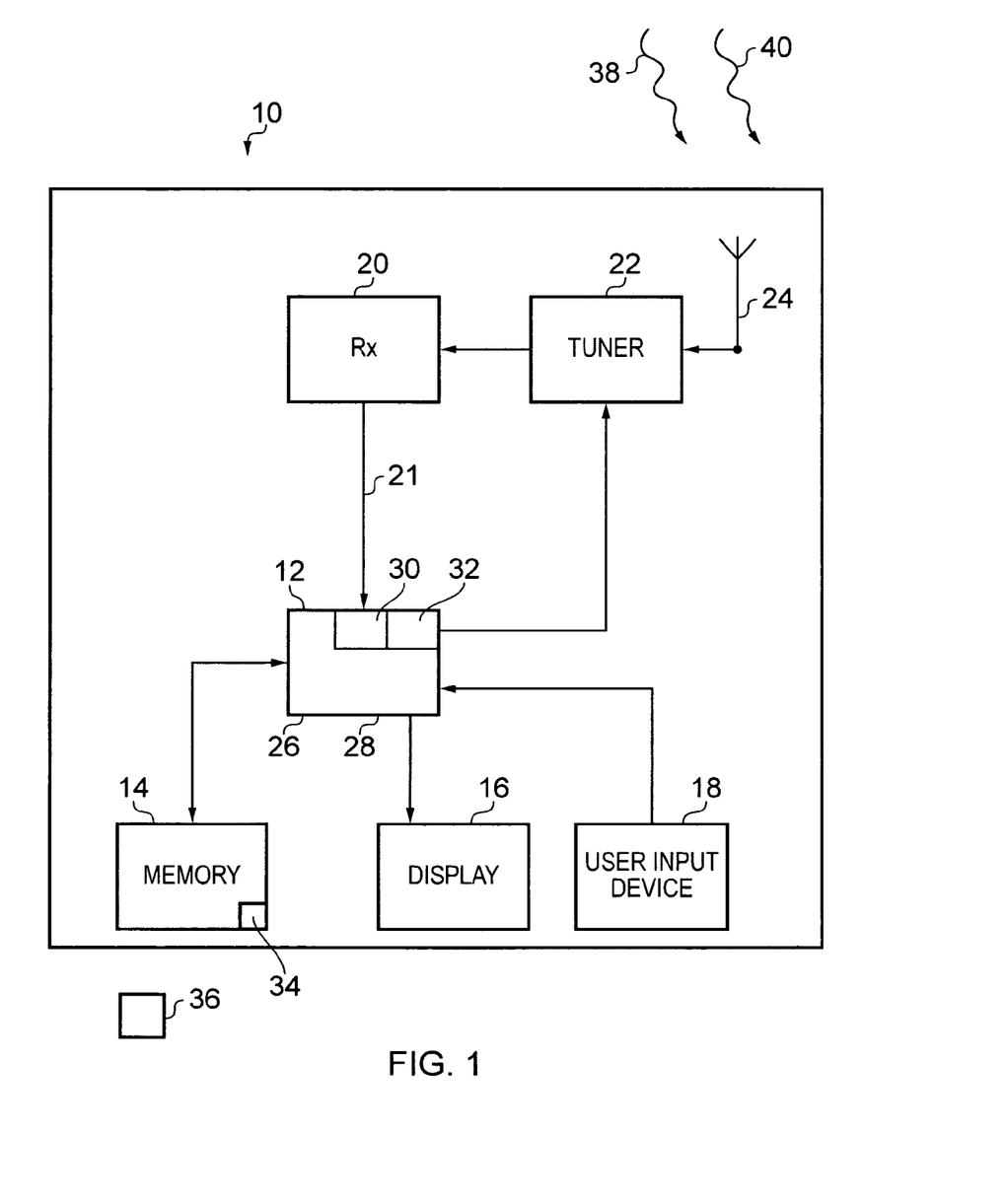
FIG. 1 illustrates a schematic diagram of an apparatus according to various embodiments of the present invention.

In more detail, FIG. 1 illustrates a schematic diagram of an apparatus 10 according to various embodiments of the present invention. The apparatus 10 may include a controller 12, a memory 14, a display 16, a user input device 18, a receiver 20, a tuner 22 and an antenna element 24.

The apparatus 10 may be any electronic device. For example, the apparatus 10 may be a base station, a personal computer or a portable apparatus such as a mobile cellular telephone, laptop computer, personal digital assistant (PDA) or palmtop computer. The apparatus 10 may also be a module or a chipset. As used here 'module' refers to a unit or apparatus that excludes certain parts/components that would be added by an end manufacturer or a user. In the following embodiment which is described in detail with reference to FIG. 1, the apparatus 10 is a mobile cellular telephone.

The controller 12 may be any suitable processor and may be a microprocessor. The implementation of the controller 12 can be in hardware alone (e.g. a circuit, a processor etc. . . . ), have certain aspects in software including firmware alone or can be a combination of hardware and software (including firmware). The controller 12 may be implemented using instructions that enable hardware functionality, for example, by using executable computer program instructions in a general-purpose or special-purpose processor that may be stored on a computer readable storage medium (e.g. disk, memory etc) to be executed by such a processor.

The controller 12 is configured to read from and write to the memory 14. The controller 12 may also comprise an output interface 26 via which data and/or commands are output by the controller 12 and an input interface 28 via which data and/or commands are input to the controller 12.

In various embodiments of the present invention, the controller 12 includes a first controller module 30 and a second controller module 32. It should be appreciated that the first and second controller modules 30, 32 may be different portions of software (i.e. they may separate portions of program code) and/or may be different portions of hardware (i.e. they may be physically separate circuits).

The memory 14 may be any suitable memory and may, for example be permanent built-in memory such as flash memory or it may be a removable memory such as a hard disk, secure digital (SD) card or a micro-drive. The memory 14 may store a computer program 34 comprising computer program instructions that control the operation of the apparatus 10 when loaded into the controller 12. The computer program instructions 34 provide the logic and routines that enables the apparatus 10 to perform the methods illustrated in FIGS. 2, 5 and 7. The controller 12 by reading the memory 14 is able to load and execute the computer program 34.

Although the memory 14 is illustrated as a single component it may be implemented as one or more separate components some or all of which may be integrated/removable and/or may provide permanent/semi-permanent/dynamic/cached storage.

The computer program may arrive at the apparatus 10 via any suitable delivery mechanism 36. The delivery mechanism 36 may be, for example, a computer-readable storage medium, a computer program product, a memory device, a record medium such as a CD-ROM or DVD, an article of manufacture that tangibly embodies the computer program 34. The delivery mechanism 36 may be a signal configured to reliably transfer the computer program 34. The apparatus 10 may propagate or transmit the computer program 34 as a computer data signal.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The computer program instructions provide: computer readable program means 34 for processing at a first processing frequency, such that each instance of processing is separated by a first processing time period, at least a first signal; computer readable program means 34 for increasing the processing frequency to a second processing frequency and switching from processing the first signal to processing a second signal; computer readable program means 34 for determining a parameter indicative of the quality of the second signal; and computer readable program means 34 for determining, within the first processing time period measured from the last instance of processing the first signal at the first frequency, which one or more signals to process at the next instance of processing by comparing respective parameters of at least the first and second signals.

The display 16 is configured to receive and display data from the controller 12. The controller 12 may read data from the memory 14 and provide it to the display 16 for display to a user of the apparatus 10. The display 16 may be any suitable display and may be for example, a thin film transistor (TFT) display or a liquid crystal display (LCD).

The user input device 18 is operable by a user to provide control signals to the controller 12. For example, the user input device 18 may be operable by a user of the apparatus 10 to control a graphical user interface displayed on the display 16. The user input device 18 may be a keypad of the mobile cellular telephone 10 or may be incorporated into the display 16 to provide a touch screen display. The user input device 18 may include a microphone and may allow a user to control what is presented on the display 16 using his or her voice.

The receiver 20 is configured to decode signals received at the antenna element 24 and provide them to the first controller module 30 for processing. The receiver 20 may be connected to the controller 12 via a single transmission line 21 (i.e. a single RF channel). In some embodiments of the present invention, the apparatus 10 includes a transceiver 20 instead of a receiver.

The tuner 22 is configured to adapt the impedance of the antenna element 24 and thereby adapt the operational resonant frequency band of the antenna element 24. In various embodiments, the tuner 22 is configured to adapt the operational resonant frequency band of the antenna element 24 between a first operational frequency band and a second, different, operational frequency band. It should be appreciated however that the tuner 22 may be configured to adapt the operational resonant frequency band of the antenna element 24 so that it is operable in more than two different operational frequency bands.

The tuner 22 may include any suitable circuitry for affecting the above mentioned change in impedance for the antenna element 24. For example, the tuner 22 may include a plurality of reactive components and at least one switch for selecting the reactive components. The reactive components may include, for example, transmission lines, capacitors and inductors.

The antenna element 24 may be any suitable antenna element and may be, for example, a planar inverted F antenna (PIFA), an inverted F antenna (IFA), a planar inverted L antenna (PILA), an inverted L antenna (ILA), a loop antenna, a helical antenna, a monopole antenna, a dipole antenna or a whip antenna.

The antenna element 24 may be operable to efficiently receive radio frequency signals 38, 40 in any operational radio frequency band or according to any radio frequency protocol. For example, the antenna element 24 may be operable in any one or more of the following operational frequency bands and protocols: AM radio (0.535-1.705 MHz); FM radio (76-108 MHz); Bluetooth (2400-2483.5 MHz); WLAN (2400-2483.5 MHz); HLAN (5150-5850 MHz); GPS (1176.45 MHz, 1227.6 MHz & 1570.42-1580.42 MHz); US-GSM 850 (824-894 MHz); EGSM 900 (880-960 MHz); EU-WCDMA 900 (880-960 MHz); PCN/DCS 1800 (1710-1880 MHz); US-WCDMA 1900 (1850-1990 MHz); WCDMA 2100 (Tx: 1920-1980 MHz Rx: 2110-2180 MHz); PCS1900 (1850-1990 MHz); UWB Lower (3100-4900 MHz); UWB Upper (6000-10600 MHz); DVB-H (470-702 MHz); DVB-H US (1670-1675 MHz); DRM (0.15-30 MHz); Wi Max (2300-2400 MHz, 2305-2360 MHz, 2496-2690 MHz, 3300-3400 MHz, 3400-3800 MHz, 5250-5875 MHz); DAB (174.928-239.2 MHz, 1452.96-1490.62 MHz); RFID LF (0.125-0.134 MHz); RFID HF (13.56-13.56 MHz); RFID UHF (433 MHz, 865-956 MHz, 2450 MHz). It should be appreciated that the antenna element 24 may be operable in operational frequency bands and protocols different to those mentioned in the above list. An operational frequency band is a frequency range over which an antenna can efficiently operate. Efficient operation occurs, for example, when the antenna element's 24 insertion loss S11 is greater than an operational threshold such as 4 dB or 6 dB.

In the following embodiment, the tuner 22 is configured to adapt the resonant frequency band of the antenna element 24 between a first operational frequency band at 1227.6 MHz and a second operational frequency band at 1575.42 MHz. Consequently, the antenna element 24 may be adapted to receive a first (GPS) signal 38 at 1227.6 MHz and a second (GPS) signal 40 at 1575.42 MHz.

In the following embodiment, the first controller module 30 is a measurement processor and the second controller module 32 is a position processor. The measurement processor 30 is configured to read and process the first and second signals 38, 40 from the output of the receiver 20 and provide them to the position processor 32. The position processor 32 is configured to process the first and second signals 38, 40 and control the display 16 to display navigational information (such as global position and velocity) in the first and second signals 38, 40 to a user of the apparatus 10.

Figure 3:
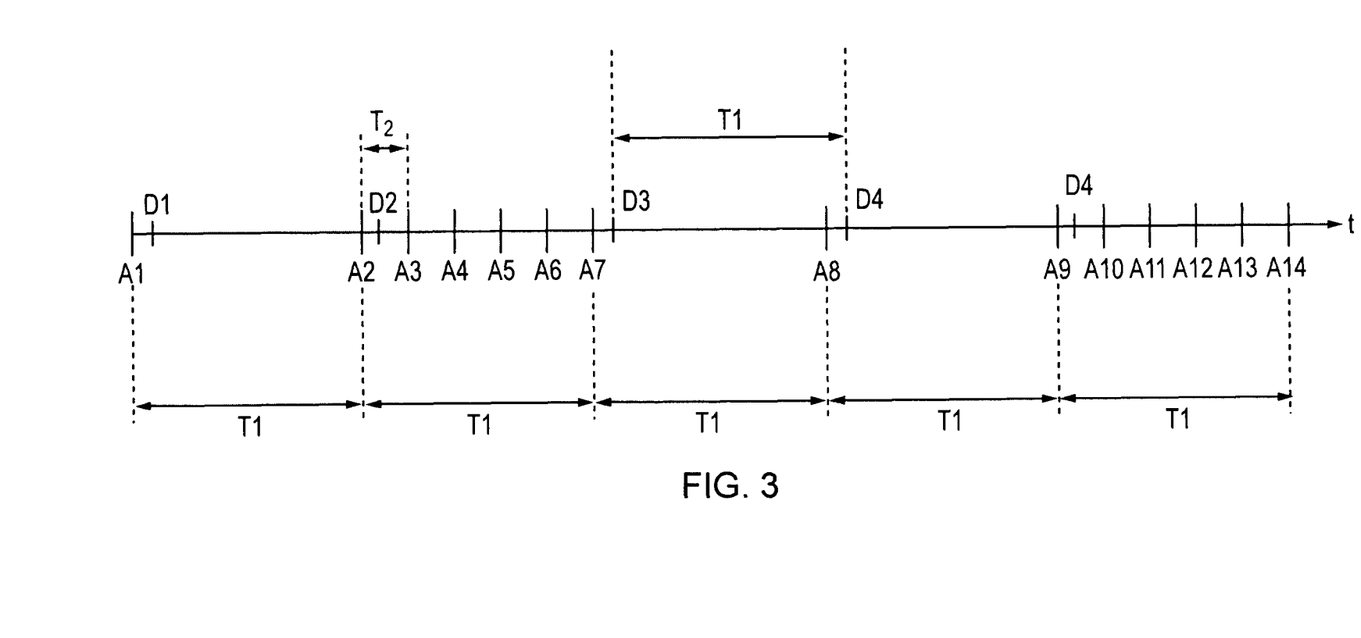
FIG. 3 illustrates a time chart for processing a first signal and a second signal according to various embodiments of the present invention.

With reference to FIGS. 2 and 3, at block 42, the antenna element 24 is operable in the first operational frequency band at 1227.6 MHz and consequently receives the first GPS signal 38. The first GPS signal 38 is then provided to the receiver 20 for decoding. The measurement processor 30 reads and processes the output of the receiver 20 at a first processing frequency so that each instance of processing is separated by a first processing period T1.

With reference to FIG. 3, the measurement processor 30 reads and processes the first GPS signal 38 at instance A1 and provides the first GPS signal 38 to the position processor 32. The position processor 32 then controls the display 16 to display navigational information in the first signal 38 at instance D1. At a time T1 later, the measurement processor 30 reads and processes the first GPS signal 38 at instance A2 and provides the first GPS signal 38 to the position processor 32 for display on the display 16 at instance D2. It should be appreciated that each instance of display D1, D2, D3 and D4 may also be separated from one another by the time T1.

At block 44, after instance A2, the position processor 32 sends a control signal to the measurement processor 30 to increase the rate of processing from the first processing frequency to a second processing frequency so that each instance of processing is separated by a second processing period T2. In the present embodiment, the first processing frequency is 1 Hz and the second processing frequency is 5 Hz. Consequently, at instances A3, A4, A5, A6 and A7, the measurement processor 30 is configured to read and process the output from the receiver 20. The instances A3, A4, A5, A6 and A7 are separated from one another by the second processing period, T2.

At block 46, the position processor 32 controls the tuner 22 to change the operational resonant frequency band of the antenna element 24 from the first operational frequency band to the second operational frequency band (i.e. from 1227.6 MHz to 1575.42 MHz). Then, at instances A3, A4, A5 and A6, the measurement processor 30 reads and processes the second signal 40 and provides the second signal to the position processor 32.

At block 48, the position processor 32 determines a parameter indicative of the quality of the second signal 40 between instances A6 and A7 and within the first processing period as measured from the last instance at processing at the first processing frequency (i.e. A2). In the present embodiment, the position processor 32 determines the average signal to noise ratio of the second signal 32 as measured from the instances of processing at A3, A4, A5 and A6.

At block 50, the position processor 32 determines which signal to process at the next instance of processing (A7) by comparing the determined parameter of the second signal against a parameter indicative of the quality of the first signal 38 (e.g. the signal to noise ratio of the first signal 38). The signal to process at the next instance of processing may be signal which has the highest quality (e.g. the highest signal to noise ratio).

In this embodiment, the parameter indicative of the quality of the first signal is determined by the position processor 32 using the received first signal at instances A1 and A2. However, it should be appreciated that in other embodiments, the position processor 32 may control the tuner 22 (at block 46) to change the operational resonant frequency band of the antenna element 24 back to the first operational resonant frequency band for instances A5 and A6 so that the parameter of the first signal 38 may be determined from instances A5 and A6 (i.e. when processing at the second processing frequency and within the first processing period as measured from the last instance at processing at the first processing frequency).

At block 52, the position processor 32 selects which signal to process at the next instance of processing (A7) by controlling the tuner 22 to provide the antenna element 24 with an impedance so that it is operational to receive either the first signal 38 or the second signal 40 depending on which signal is determined to have the highest quality.

The measurement processor 30 then reads and processes the selected signal at instance A7 and provides it to the position processor 32 for display on the display at D3. The position processor 32 also provides a control signal to the measurement processor 30 to decrease the processing frequency from the second processing frequency to the first processing frequency after instance A7 (i.e. after the expiry of the first processing period as measured from the last instance at processing at the first processing frequency).

It should be appreciated that the above method may be repeated periodically or whenever requested by the position processor 32. In the present embodiment, the above method is repeated periodically at every 2×T1 seconds (at instances A10, A11, A12, A13 and A14 as illustrated in FIG. 3).

Consequently, the controller 12 may determine and select which signal to receive from the antenna 24 within the first processing period T1 as measured from the last instance of processing at the first processing frequency. This may provide an advantage if the first and second signals 38, 40 have different quality (e.g. different signal to noise ratios) because they may enable the controller 12 to select the signal with the highest quality signal. Additionally, since the determination and selection is performed within the first processing period, embodiments of the present invention may not affect the presentation of information in the signals to the user.

For example, where the first and second signals 38, 40 include navigational information for display on the display 16, the controller 12 may determine which signal to use without affecting the display of that information on the display 14 (since the determination and selection is performed between each instance of presentation). Therefore, embodiments of the present invention may increase the reliability of an apparatus 10 in providing information to a user since the selection of the highest quality signal may not affect the presentation of the information.

Figure 4:
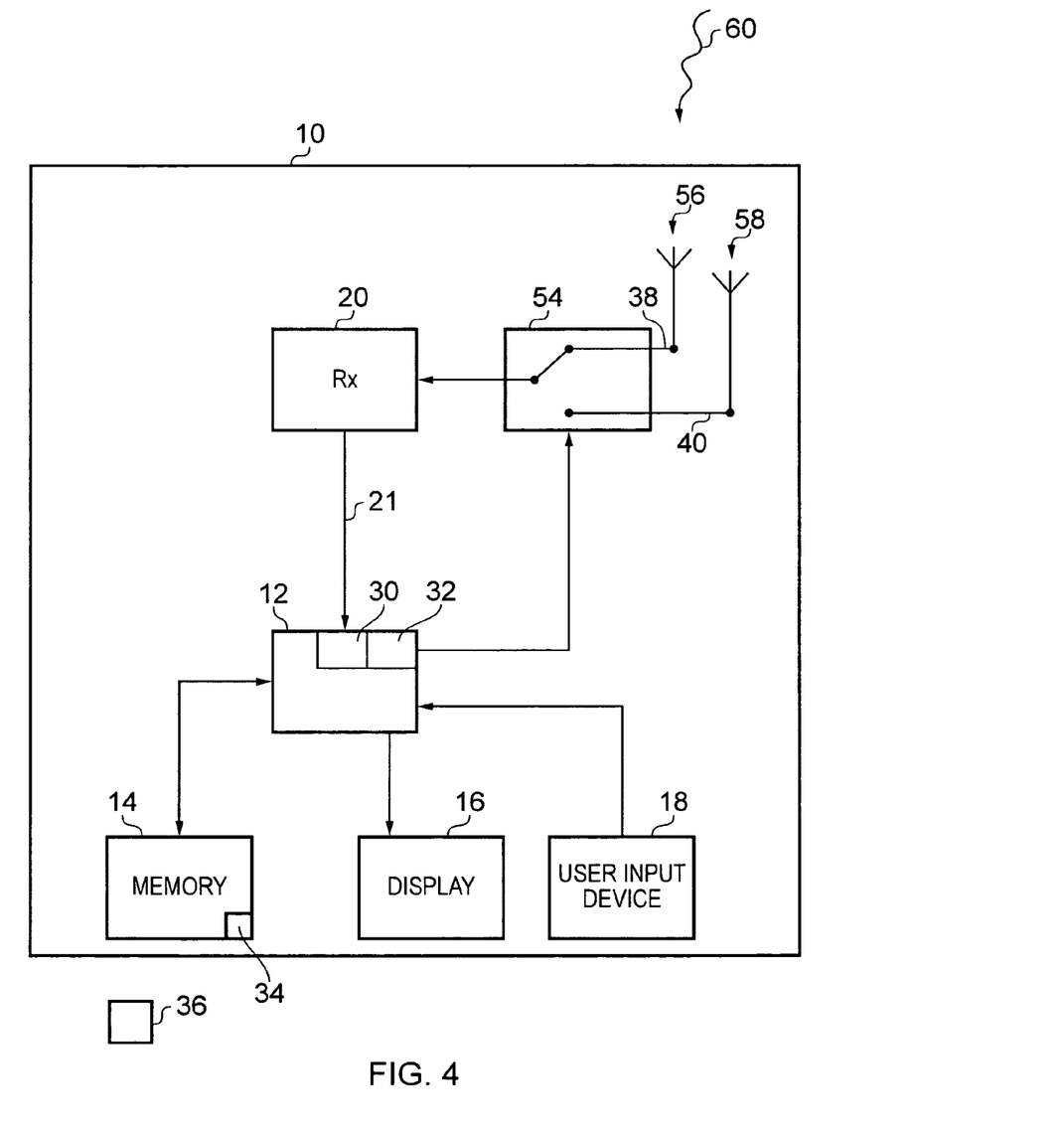
FIG. 4 illustrates a schematic diagram of another apparatus according to various embodiments of the present invention.

FIG. 4 illustrates a schematic diagram of another apparatus according to various embodiments of the present invention. The apparatus 10 illustrated in FIG. 4 is similar to the apparatus illustrated in FIG. 1 and where the features are similar, the same reference numerals are used. The apparatus 10 illustrated in FIG. 4 differs from the apparatus illustrated in FIG. 1 in that the tuner 22 and the antenna element 24 are replaced with a switch 54, a first antenna element 56 and a second antenna element 58.

In this embodiment, the apparatus 10 is configured to receive a GPS signal 60 which is in a first operational frequency band (e.g. 1575.42 MHz). The first and second antenna elements 56 and 58 are both operable in the first operational frequency band and are hence both configured to receive the GPS signal 60. The first antenna element 56 is configured to provide a first signal 38 to the receiver 20 and the second antenna element 58 is configured to provide a second signal 40 to the receiver 20.

The first and second antenna element 56, 58 may be positioned in different locations in the apparatus 10. For example, where the apparatus is a mobile cellular telephone, the first antenna element 56 may be positioned at the top edge of the mobile telephone (e.g. near the loudspeaker) and the second antenna element 58 may be positioned at the bottom edge of the mobile telephone (e.g. near the microphone).

The first and second antenna elements 56, 58 are connected to the receiver 20 via the switch 54. The position processor 32 is configured to control the switch 54 so that either the first antenna element 56 is connected to the receiver 20 or so that the second antenna element 58 is connected to the receiver 20. Consequently, the position processor 32 is configured to control which signal of the first and second signal 38, 40 that the receiver 20 receives.

FIG. 5 illustrates a flow chart of a method for the apparatus illustrated in FIG. 4 according to various embodiments of the present invention. With reference to FIGS. 3 and 5, at block 62, the first antenna element 56 is connected to the receiver 20 via the switch 54 and consequently, the receiver 20 receives the first signal 38 for decoding. The measurement processor 30 reads and processes the output of the receiver 20 at a first processing frequency so that each instance of processing is separated by a first processing period T1.

With reference to FIG. 3, the measurement processor 30 reads and processes the first signal 38 at instance A1 and provides the first signal 38 to the position processor 32. The position processor 32 then controls the display 16 to display navigational information in the first signal 38 at instance D1. At a time T1 later, the measurement processor 30 reads and processes the first signal 38 at instance A2 and provides the first signal 38 to the position processor 32 for display on the display 16 at instance D2. It should be appreciated that each instance of display D1, D2, D3 and D4 may also be separated from one another by the time T1.

At block 64, after instance A2, the position processor 32 sends a control signal to the measurement processor 30 to increase the rate of processing from the first processing frequency to a second processing frequency so that each instance of processing is separated by a second processing period T2. In the present embodiment, the first processing frequency is 1 Hz and the second processing frequency is 5 Hz. Consequently, at instances A3, A4, A5, A6 and A7, the measurement processor 30 is configured to read and process the output from the receiver 20 at the second processing frequency. The instances A3, A4, A5, A6 and A7 are separated by the second processing period, T2.

At block 66, the position processor 32 controls the switch 54 to switch from connecting to the first antenna element 56 to the second antenna element 58. Then, at instances A3, A4, A5 and A6, the measurement processor 30 reads and processes the second signal 40 and provides the second signal to the position processor 32.

At block 68, the position processor 32 determines a parameter indicative of the quality of the second signal 40 between instances A6 and A7 and within the first processing period as measured from the last instance of processing at the first processing frequency (i.e. A2). In the present embodiment, the position processor 32 determines the average signal to noise ratio of the second signal 32 as measured from the instances of processing at A3, A4, A5 and A6.

At block 70, the position processor 32 determines which signal to process at the next instance of processing (A7) by comparing the determined parameter of the second signal against a parameter indicative of the quality of the first signal 38 (e.g. the signal to noise ratio of the first signal 38). The signal to process at the next instance of processing may be signal which has the highest quality (e.g. the highest signal to noise ratio).

In this embodiment, the parameter indicative of the quality of the first signal is determined by the position processor 32 using the received first signal at instances A1 and A2. However, it should be appreciated that in other embodiments, the position processor 32 may control the switch (at block 66) to connect the receiver 20 to the first antenna element 56 and hence receive the first signal 38 for instances A5 and A6 so that the parameter of the first signal 38 may be determined from instances A5 and A6 (i.e. when processing at the second processing frequency and within the first processing period as measured from the last instance of processing at the first processing frequency).

At block 72, the position processor 32 selects which signal to process at the next instance of processing (A7) by controlling the switch 22 to connect the selected antenna element to the receiver 20 depending on which signal is determined to have the highest quality.

The measurement processor 30 then reads and processes the signal from the selected antenna element at instance A7 and provides it to the position processor 32 for display on the display at instance D3. The position processor 32 also provides a control signal to the measurement processor 30 to decrease the processing frequency from the second processing frequency to the first processing frequency after instance A7.

It should be appreciated that the above method may be repeated periodically or whenever requested by the position processor 32. In the present embodiment, the above method is repeated periodically at every 2×T1 seconds (at instances A10, A11, A12, A13 and A14 as illustrated in FIG. 3).

Consequently, the controller 12 may determine and select which antenna element to receive signals from within the first processing period T1. This may provide an advantage if the first and second signals 38, 40 have different quality because they may enable the controller 12 to select the antenna with the best reception performance. Additionally, since the determination and selection of the antenna element is performed within the first processing period, embodiments of the present invention may not affect the presentation of information in the signals to the user. It should be appreciated that the quality of a signal received by an antenna element may be affected by the orientation of the apparatus (and hence the orientation of the antenna elements) relative to the source of the signals. Additionally, the signal quality of an antenna element may be affected by the proximity of objects to the antenna element which electromagnetically couple to the antenna element and cause interference.

As an example, where the first and second signals 38, 40 include navigational information for display on the display 16, the controller 12 may determine which antenna element to use without affecting the display of that information on the display 14 (since the determination and selection is performed between each instance of presentation). Therefore, embodiments of the present invention may increase the reliability of an apparatus 10 in providing information to a user since the selection of the antenna with the best signal quality may not affect the presentation of the information.

Figure 6:
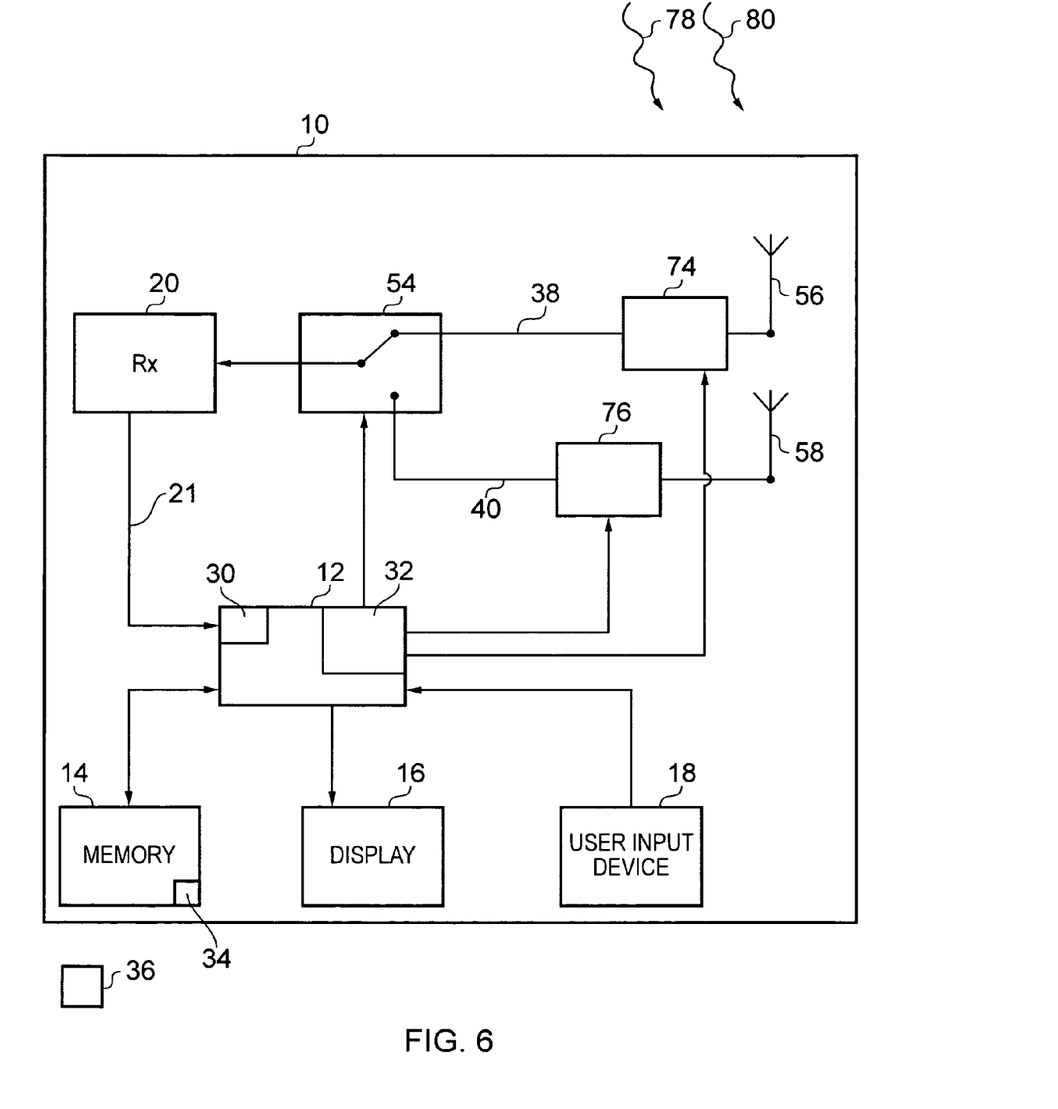
FIG. 6 illustrates a schematic diagram of a further apparatus according to various embodiments of the present invention.

FIG. 6 illustrates a schematic diagram of a further apparatus according to various embodiments of the present invention. The apparatus 10 illustrated in FIG. 6 is similar to the apparatus illustrated in FIG. 4 and where the features are similar, the same reference numerals are used. The apparatus 10 illustrated in FIG. 6 differs from the apparatus illustrated in FIG. 4 in that the first antenna element 56 is connected to the switch 54 via a first tuner 74 and that the second antenna element 58 is connected to the switch 54 via a second tuner 76.

The first tuner 74 is configured to adapt the operational resonant frequency band of the first antenna element 56 between a first operational frequency band at 1227.6 MHz and a second operational frequency band at 1575.42 MHz. Consequently, the first antenna element 56 may be adapted to receive a GPS signal 78 at 1227.6 MHz and a GPS signal 80 at 1575.42 MHz. The second tuner 76 is configured to adapt the operational resonant frequency band of the second antenna element 58 between a first operational frequency band at 1227.6 MHz and a second operational frequency band at 1575.42 MHz. Consequently, the second antenna element 58 may be adapted to receive the GPS signal 78 at 1227.6 MHz and the GPS signal 80 at 1575.42 MHz. The position processor 32 may be configured to control the first tuner 74 and the second tuner 76 to adapt the operational resonant frequency band of the first antenna element 56 and the second antenna element 58 respectively.

In this embodiment, the first antenna element 56 is configured to provide a first signal 38 to the receiver 20 and the second antenna element 58 is configured to provide a second signal 40 to the receiver 20. The first and second antenna element 56, 58 may be positioned in different locations in the apparatus 10. For example, where the apparatus is a mobile cellular telephone, the first antenna element 56 may be positioned at the top edge of the mobile telephone (e.g. near the loudspeaker) and the second antenna element 58 may be positioned at the bottom edge of the mobile telephone (e.g. near the microphone).

The first and second antenna elements 56, 58 are connected to the receiver 20 via the switch 54. The position processor 32 is configured to control the switch 54 so that either the first antenna element 56 is connected to the receiver 20 or so that the second antenna element 58 is connected to the receiver 20. Consequently, the position processor 32 is configured to control which signal of the first and second signal 38, 40 that the receiver 20 receives.

FIG. 7 illustrates a flow chart of a method for the apparatus illustrated in FIG. 6 according to various embodiments of the present invention. With reference to FIGS. 3 and 7, at block 82, the first antenna element 56 is connected to the receiver 20 via the switch 54 and consequently, the receiver 20 receives the first signal 38 for decoding. The first tuner 74 is configured to adapt the operational resonant frequency band of the first antenna element 56 so that it is equal to the first operational frequency band and consequently, the antenna element 56 is configured to receive the signal 78. The measurement processor 30 reads and processes the output of the receiver 20 at a first processing frequency so that each instance of processing is separated by a first processing period T1.

With reference to FIG. 3, the measurement processor 30 reads and processes the first signal 38 at instance A1 and provides the first signal 38 to the position processor 32. The position processor 32 then controls the display 16 to display navigational information in the first signal 38 at instance D1. At a time T1 later, the measurement processor 30 reads and processes the first signal 38 at instance A2 and provides the first signal 38 to the position processor 32 for display on the display 16 at instance D2. It should be appreciated that each instance of display D1, D2, D3 and D4 may also be separated from one another by the time T1.

At block 84, after instance A2, the position processor 32 sends a control signal to the measurement processor 30 to increase the rate of processing from the first processing frequency to a second processing frequency so that each instance of processing is separated by a second processing period T2. In the present embodiment, the first processing frequency is 1 Hz and the second processing frequency is 5 Hz. Consequently, at instances A3, A4, A5, A6 and A7, the measurement processor 30 is configured to read and process the output from the receiver 20 at the second processing frequency. The instances A3, A4, A5, A6 and A7 are separated by the second processing period, T2.

At block 86, the position processor 32 controls the switch 54 to switch from connecting to the first antenna element 56 to the second antenna element 58. Then, at instances A3, A4, A5 and A6, the measurement processor 30 reads and processes the second signal 40 and provides the second signal to the position processor 32. It should be appreciated that the position processor 32 may also control the second tuner 76 to adapt the operational resonant frequency band of the second antenna element 58 so that it receives the GPS signal 78 for some of the instances (e.g. instances A3 and A4) and so that it receives the GPS signal 80 for the remaining instances (e.g. instances A5 and A6).

At block 88, the position processor 32 determines a parameter indicative of the quality of the second signal 40 between instances A6 and A7 and within the first processing period as measured from the last instance of processing at the first processing frequency (i.e. A2). In the present embodiment, the position processor 32 determines the average signal to noise ratio of the second signal 32 as measured from the instances of processing at A3, A4, A5 and A6. In the above embodiment where the second antenna element 58 receives the signal 78 and the signal 80 at instances A3, A4, A5 and A6, the position processor 32 may determine a parameter indicative of the quality of the signal 78 as received at the second antenna element 58 and a parameter indicative of the quality of the signal 80 as received at the second antenna element 58.

At block 90, the position processor 32 determines which signal to process at the next instance of processing (A7) by comparing the determined parameter(s) of the second signal against a parameter(s) indicative of the quality of the first signal 38 (e.g. the signal to noise ratio of the first signal 38). The signal to process at the next instance of processing may be the signal which has the best quality (e.g. the highest signal to noise ratio).

In this embodiment, the parameters indicative of the quality of the first signal are determined by the position processor 32 using the received first signal 38 at instances A1 and A2. For example, the position processor 32 may determine, at instance A1, a parameter indicative of the quality of the first signal 38 when the first antenna element 54 receives the signal 78. At instance A2, the position processor 32 may determine a parameter indicative of the quality of the first signal 38 when the first antenna element 54 receives the signal 80.

However, it should be appreciated that in other embodiments, the position processor 32 may control the switch 54 (at block 86) to connect the receiver 20 to the first antenna element 56 and hence receive the first signal 38 for instances A5 and A6 (for example) so that the parameter of the first signal 38 may be determined from instances A5 and A6. In one embodiment, the position processor 32 may control the switch 54 and the first and second tuners 74, 76 so that at instance A3, the receiver 20 receives signal 78 as the second signal 40, at instance A4, the receiver 20 receives signal 80 as the second signal 40, at instance A5, the receiver 20 receives signal 78 as the first signal 38 and at instance A6, the receiver 20 receives signal 80 as the first signal 38.

At block 92, the position processor 32 selects which signal to process at the next instance of processing (A7) by controlling the switch 54 to connect the selected antenna element to the receiver 20 depending on which antenna element is determined to have the highest signal quality. The position processor 32 may also control the tuner 74, 76 connected to the selected antenna to select the best operational resonant frequency band for the selected antenna.

The measurement processor 30 then reads and processes the signal from the selected antenna element at the selected operational resonant frequency band at instance A7 and provides it to the position processor 32 for display on the display at D3. The position processor 32 also provides a control signal to the measurement processor 30 to decrease the processing frequency from the second processing frequency to the first processing frequency after instance A7.

It should be appreciated that the above method may be repeated periodically or whenever requested by the position processor 32. In the present embodiment, the above method is repeated periodically at every 2×T1 seconds (at instances A10, A11, A12, A13 and A14 as illustrated in FIG. 3).

Consequently, the controller 12 may determine which received signal has the highest quality and select the best antenna element and the best operational frequency band for that antenna within the first processing period T1 as measured from the last instance of processing at the first processing frequency (i.e. A2). This may provide an advantage if the first and second signals 38, 40 have different quality because they may enable the controller 12 to select the antenna and the best operational frequency band with the best signal quality. Embodiments of the invention may not affect the presentation of information in the signals to the user because the determination and selection is performed within the first processing period.

As an example, where the first and second signals 38, 40 include navigational information for display on the display 16, the controller 12 may determine which antenna element and which operational resonant frequency band to use without affecting the display of that information on the display 14 (since the determination and selection is performed between each instance of presentation). Therefore, embodiments of the present invention may increase the reliability of an apparatus 10 in providing information to a user since the selection of an antenna and a operational resonant frequency band with the best signal quality may not affect the presentation of the information.

It should be appreciated that the use of word 'connect' or 'couple' may mean that two electronic components may be operationally coupled and any number or combination of intervening elements can exist between them (including no intervening elements).

The blocks illustrated in the FIGS. 3, 5 and 7 may represent steps in a method and/or sections of code in the computer program 34. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the apparatus 10 may include more than two antenna elements and be arranged to receive signals in more than two operational frequency bands. The position processor 32 may be configured to select the highest quality signal from more than two antenna elements and from more than two operational frequency bands.

It should be appreciated that embodiments of the invention may apply to an antenna array which includes a plurality of antenna elements. The position processor 32 may be configured to determine and select the combination of antenna elements which provide the highest quality signal reception.

A parameter indicative of the quality of a received signal may be a parameter other than the signal to noise ratio of a signal. For example, where the received signal is a GPS signal (or other Global Navigation Satellite System (GNSS) signal) a parameter indicative of the quality of a received signal may be the expected positioning accuracy calculated from the GPS satellite geometry (Dilution of Precision (DOP)). The DOP may vary between antenna elements in an apparatus because objects nearby to an antenna arrangement (e.g. a user's hand) may affect which satellites the antenna element may receive signals from. Additionally, a parameter indicative of the quality of a received signal may also be the expected positioning accuracy calculated from the average signal measurement uncertainty, the Circular Error Probable calculated from the covariance matrix weighted by measurement uncertainties, the average code phase and/or Doppler uncertainties. The position processor 32 may be configured to determine the quality of a signal by determining any combination of the parameters mentioned above. The above mentioned parameters are well known within the art and will consequently not be discussed in any greater detail.

It should be appreciated that embodiments of the present invention may be applied to signals in different operational frequency bands and different protocols to those mentioned in the above embodiments. For example, the signals may be GSM signals and the instances D1, D2, D3 etc. . . . may be where audio output is provided to a user of the apparatus from a loudspeaker.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
processing at a first processing frequency in one or more instances of processing, such that each instance of processing is separated by a first processing time period, at least a first signal wherein the first signal is suitable for determining navigational information;
increasing the first processing frequency to a second processing frequency and switching from processing the first signal to processing a second signal wherein the second signal is suitable for determining navigational information;
determining a parameter indicative of a quality of the first signal;
determining a parameter indicative of a quality of the second signal;
determining, within the first processing time period measured from a last instance of processing the first signal at the first processing frequency, which one of the first signal and the second signal to process at a next instance of processing by comparing respective parameters of at least the first signal and the second signal;
selecting one of at least the first signal and the second signal for the next instance of processing at the first processing frequency, using the determined one of the first signal and the second signal to process, within the first processing time period;
determining navigational information from the selected signal; and
controlling presentation of the navigational information from the selected signal such that instances of presentation are separated by the first processing time period.

2. The method as claimed in claim 1, comprising determining a parameter indicative of a quality of the first signal while processing the first signal at the first processing frequency or at the second processing frequency.

3. The method as claimed in claim 1, comprising switching from processing the second signal to processing the first signal within the first processing time period measured from the last instance of processing the first signal at the first processing frequency, and determining a parameter indicative of a quality of the first signal.

4. The method as claimed in claim 1, wherein controlling presentation of information in the selected signal includes controlling a display to display navigational information using the selected signal.

5. The method as claimed in claim 1, further comprising receiving the first and second signals via a single antenna element, wherein the first signal is in a first operational frequency band and the second signal is in a second operational frequency band, different to the first operational frequency band.

6. The method as claimed in claim 5, further comprising controlling a tuner to adapt the resonant frequency band of the antenna element between the first operational frequency band and the second operational frequency band.

7. The method as claimed in claim 1, further comprising receiving the first signal from a first antenna element and receiving the second signal from a second antenna element.

8. The method as claimed in claim 7, further comprising controlling a switch to switch between connecting to the first antenna element and to the second antenna element to receive the first signal or second signal respectively.

9. The method as claimed in claim 7, wherein the first signal and the second signal are in the same operational frequency band.

10. The method as claimed in claim 7, further comprising controlling a first tuner to adapt the resonant frequency band of the first antenna element between a first operational frequency band and a second operational frequency band.

11. The method as claimed in claim 7, further comprising controlling a second tuner to adapt the resonant frequency band of the second antenna element between a first operational frequency band and a second operational frequency band.

12. The method as claimed in claim 1, wherein controlling presentation of information in the selected signal includes controlling a loudspeaker to provide audio output.

13. An apparatus comprising:
a controller including: a first controller module configured to process at a first processing frequency in one or more instances of processing, such that each instance of processing is separated by a first processing time period, at least a first signal wherein the first signal is suitable for determining navigational information;
a second controller module configured to control the first controller module to increase the first processing frequency to a second processing frequency, and configured to control switching from processing the first signal to processing a second signal wherein the second signal is suitable for determining navigational information, and configured to determine a parameter indicative of a quality of the first signal, and configured to determine a parameter indicative of a quality of the second signal; and configured to determine, within the first processing time period measured from a last instance of processing the first signal at the first processing frequency, which one of the first signal and the second signal to process at a next instance of processing by comparing respective parameters of at least the first signal and the second signal; and configured to select one of at least the first signal and the second signal for the next instance of processing at the first processing frequency, using the determined one of the first and second signal to process, within the first processing time period; and configured to determine navigational information from the selected signal; and configured to control presentation of the navigational information from the selected signal such that instances of presentation are separated by the first processing time period.

14. The apparatus as claimed in claim 13, wherein the second controller module is configured to determine a parameter indicative of a quality of the first signal while the first controller module is processing the first signal at the first processing frequency or at the second processing frequency.

15. The apparatus as claimed in claim 13, wherein the second controller module is configured to control switching from processing the second signal to processing the first signal within the first processing time period measured from the last instance of processing the first signal at the first processing frequency, and is configured to determine a parameter indicative of a quality of the first signal.

16. The apparatus as claimed in claim 13, wherein the controller is configured to control presentation of information in the selected signal by controlling a display to display navigational information using the selected signal.

17. The apparatus as claimed in claim 13, further comprising a single antenna element configured to receive the first signal and the second signal, wherein the first signal is in a first operational frequency band and the second signal is in a second operational frequency band, different to the first operational frequency band.

18. The apparatus as claimed in claim 17, further comprising a tuner configured to adapt the resonant frequency band of the antenna element between the first operational frequency band and the second operational frequency band, the second controller module being configured to control the tuner.

19. The apparatus as claimed in claim 13, further comprising a first antenna element configured to receive the first signal and a second antenna element configured to receive the second signal.

20. The apparatus as claimed in claim 19, further comprising a switch configured to switch between connecting to the first antenna element and to the second antenna element to receive the first signal or second signal respectively, the second controller module being configured to control the switch.

21. The apparatus as claimed in claim 19, wherein the first signal and the second signal are in the same operational frequency band.

22. The apparatus as claimed in claim 19, further comprising a first tuner configured to adapt the resonant frequency band of the first antenna element between a first operational frequency band and a second operational frequency band, the second controller module being configured to control the first tuner.

23. The apparatus as claimed in claim 19, further comprising a second tuner configured to adapt the resonant frequency band of the second antenna element between a first operational frequency band and a second operational frequency band, the second controller module being configured to control the second tuner.

24. A module comprising the apparatus as claimed in claim 13.

25. A chipset comprising the apparatus as claimed in claim 13.

26. The apparatus as claimed in claim 13, wherein the second controller module is configured to control presentation of information in the selected signal by controlling a loudspeaker to provide audio output.

27. An electronic device comprising the apparatus as claimed in claim 13.

28. A computer-readable storage medium encoded with instructions that, when executed by a processor, cause an apparatus to perform:

processing at a first processing frequency in one or more processing instances of processing, such that each instance of processing is separated by a first processing time period, at least a first signal, wherein the first signal is suitable for determining navigational information;

increasing the first processing frequency to a second processing frequency and switching from processing the first signal to processing a second signal, wherein the second signal is suitable for determining navigational information;

determining a parameter indicative of a quality of the first signal;

determining a parameter indicative of a quality of the second signal;

determining, within the first processing time period measured from a last instance of processing the first signal at the first processing frequency, which one of the first signal and the second signal to process at a next instance of processing by comparing respective parameters of at least the first signal and the second signal;

selecting one of at least the first signal and the second signal for the next instance of processing at the first processing frequency, using the determined one of the first and second signal to process, within the first processing time period;

determining navigational information from the selected signal; and controlling presentation of the navigational information in from the selected signal such that instances of presentation are separated by the first processing time period.

29. The computer-readable storage medium as claimed in claim 28, wherein controlling presentation of information in the selected signal includes controlling a display to display navigational information using the selected signal.

30. The computer-readable storage medium as claimed in claim 28, wherein controlling presentation of information in the selected signal includes controlling a loudspeaker to provide audio output.

31. An apparatus comprising
at least one processor
and at least one memory including computer program code configured to, with the at least one processor, cause the apparatus at least to:
process at least a first signal in one or more processing instances, such that each instance of processing is separated by a first processing time period wherein the first signal is suitable for determining navigational information;
increase the first processing frequency to a second processing frequency and switching from processing the first signal to processing a second signal wherein the second signal is suitable for determining navigational information;
determine a parameter indicative of a quality of the first signal;
determine a parameter indicative of a quality of the second signal;
determine, within the first processing time period measured from a last instance of processing the first signal at the first frequency, which one of the first signal and the second signal to process at a next instance of processing by comparing respective parameters of at least the first signal and the second signal;
select one of at least the first signal and the second signal for the next instance of processing at the first processing frequency, using the determined one of the first and second signal to process, within the first processing time period;

determine navigational information from the selected signal; and control presentation of navigational information from the selected signal such that instances of presentation are separated by the first processing time period.

* * * * *

UNITED STATES PATENT AND TRADEMARK OFFICE
CERTIFICATE OF CORRECTION

PATENT NO. : 8,412,108 B2  
APPLICATION NO. : 12/082687  
DATED : April 2, 2013  
INVENTOR(S) : Kimmo Marko Tapani Alanen and Jari Tapani Syrjarinne Page 1 of 1

It is certified that error appears in the above-identified patent and that said Letters Patent is hereby corrected as shown below:

In the Claims:

In Column 18:
Lines 29-30 (claim 28): "navigational information in from" should read as -- navigational information from --.

Signed and Sealed this
Twenty-fourth Day of September, 2013

Teresa Stanek Rea
*Deputy Director of the United States Patent and Trademark Office*